Jan. 26, 1954 H. KALLMANN 2,667,586
ENERGY PROPORTIONAL COUNTING OF EXTERIOR RADIATION
Filed July 3, 1951
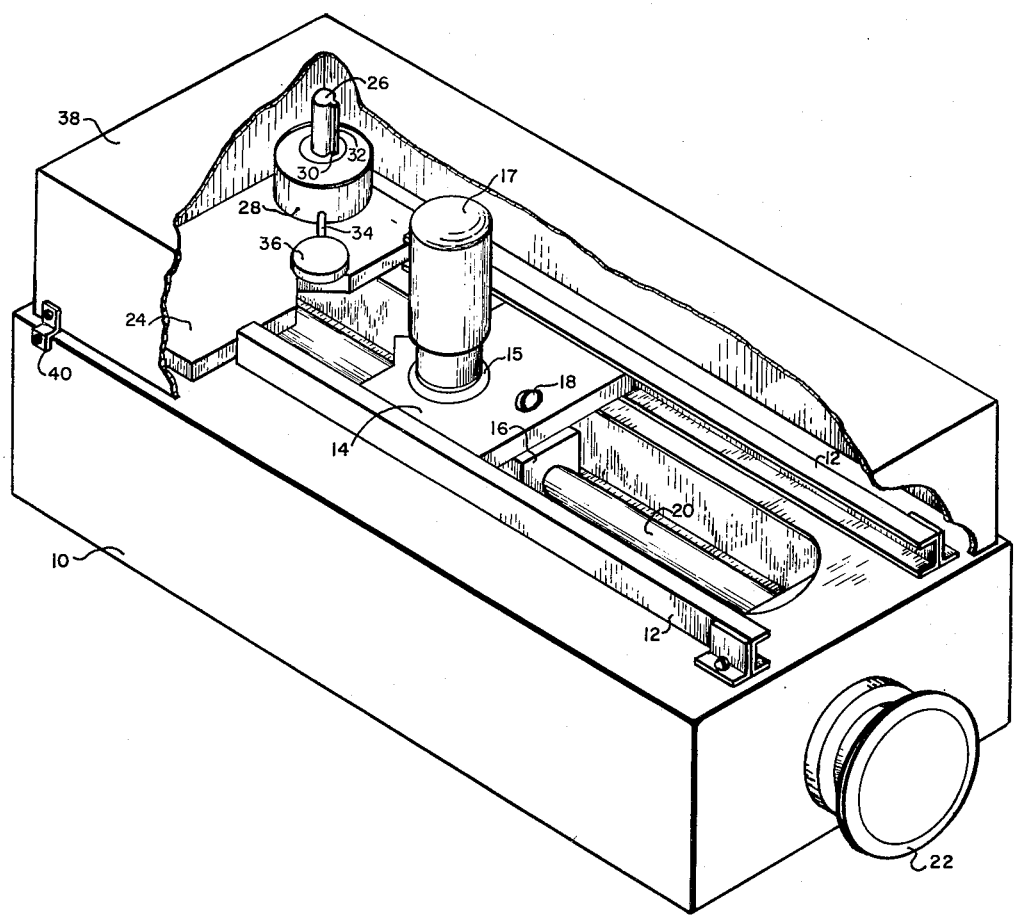
INVENTOR.
HARTMUT KALLMANN
BY
Harry M. Saragovitz
Attorney Patented Jan. 26, 1954

2,667,586

UNITED STATES PATENT OFFICE 2,667,586

ENERGY PROPORTIONAL COUNTING OF EXTERIOR RADIATION

Hartmut Kallmann, New York, N. Y., assignor to the United States of America as represented by the Secretary of the Army Application July 3, 1951, Serial No. 235,086

7 Claims. (Cl. 250—71)

(Granted under Title 35, U. S. Code (1952), sec. 266)

The invention described herein may be manufactured and used by or for the Government for governmental purposes, without the payment of any royalty thereon.

This invention relates to radiation detection and measuring equipment and more particularly to a radiation detecting and measuring device which measures the energy absorbed by a radiation sensitive element.

Instruments presently used for radiation detection and measurement are of a type that detect the presence of radiation and measure field strength in terms of the number of radioactive particles or rays present in a field. Such measurements have little biological significance because the biological effect of a field is dependent on the amount of energy which a living object placed in a radioactive field will absorb, rather than the number of radioactive quanta which strike the living object.

It is the object of this invention to determine the energy which an object placed in a radioactive field will absorb and thus produce a measurement which has direct biological significance.

This object is accomplished by modifying the typical scintillation counter circuit, which is well known to the art, to include a calibrated geometrical control means. Prior scintillation counter devices utilize crystals, which react to radioactive bombardment by scintillation, to activate a phototube attached to an electronic counting circuit. Such counting devices count all the flashes of a scintillating crystal without regard to the intensity of the individual flash, thus attributing one count to each radioactive quantum striking that crystal regardless of the amount of energy the crystal absorbs. The present invention inserts a calibrated geometrical control means which determines the interaction of the scintillating crystal and the phototube and thus converts the numerically dependent counting circuit to an energy dependent counting circuit. This last process can be best illustrated by the following mathematical analysis.

The intensity of a pulse produced by a phototube when excited by a light flash is determined by the formula $$I = \frac{MPGe}{e_n}$$

where $I$ is the intensity of the produced pulse, $M$ is the multiplication in the phototube, $P$ is the probability factor describing the probability that one light photon striking the photocathode of the phototube will release one electron from that cathode, $G$ is a geometric factor describing the probability that one photon of light emitted by the crystal will strike the photocathode of the phototube, $e$ is the energy transferred to the crystal in the event under consideration and $e_n$ is the energy necessary for creating one light photon in the crystal. $e/e_n$ describes the number of light photons produced in the crystal, $Ge/e_n$ describe the number of photons hitting the photocathode, $PGe/e_n$ describes the number of electrons released from the photocathode by a single radioactive element striking the crystal. Since what is desired is an instrument dependent on the energy absorbed by a crystal placed in a radioactive field and since the variables $P$ and $e_n$ are practically constant for a particular crystal and phototube, it is necessary to change the geometric constant $G$ of the instrument in order to achieve the desired energy dependence. This is done by inserting a shutter between the crystal and photocathode or by varying the distance between the crystal and photocathode or by doing both and thus varying the geometric factor $G$.

Since one of the properties of a typical radiation sensitive crystal is that the amount of light that it emits is almost directly proportional to the amount of energy that it absorbs, the geometric factor $G$ is varied so that the number of electrons released from the photocathode by a light flash, $PGe/e_n$, equals unity when the crystal absorbs an amount of energy equivalent to the maximum energy of any quanta in the field under study.

The geometric factor $G$ so adjusted, coupled with the linear relationship between absorbed energy and emitted light inherent in typical crystals, yields an instrument which counts once each time a maximum energy quantum is absorbed by the crystal and proportionally counts other quanta having less energy which are absorbed by the crystal. Thus each count may be considered as representing crystal absorption of one maximum energy quantum. The number of counted events may then be multiplied by the energy of the maximum energy quantum to determine total energy absorbed by the crystal.

The energy contained by the maximum energy quantum is determined by one of the processes well known to those skilled in the art, for example, by half value layer measurements as described on page 125 and following pages of the fourth printing of the volume Radiology Physics by J. K. Robertson, published in 1946 by Van Nostrand Publishing Company. The value of the maximum energy quantum will determine both the multiplication factor of the counted events and the geometric factor setting of the measuring unit of this invention. Since the factors M and P are not constant for all tubes and since the factor e is not constant for a number of crystals, each measuring device, in accordance with this invention, should be calibrated against a known energy source every time either a crystal or phototube is changed.

Other objects of this invention will appear in the following description and appended claims reference being had to the accompanying drawing consisting of one figure and illustrating one form for geometrically controlling the interaction of a scintillating medium and a phototube by varying the spacing between them.

In the figure, opaque frame 10 supports grooved guide rails 12 in which tube carriage 14 rides. Tube carriage 14 is provided with tube socket 15 for receiving phototube 17 and has electrical connections, not shown, from said tube socket to a typical electronic counting circuit, not shown. A typical circuit of this type is described in Patent No. 2,550,106 to J. W. Coltman, issued April 24, 1951. Tube carriage 14 is fixed to threaded block 16 by screw 18. Threaded block 16 engages threaded shaft 20 which is journaled at both ends in frame 10 so as to be free to rotate. One end of threaded shaft 20 extends through frame 10 and is fixed to operating knob 22. Frame 10 also supports support block 24 in which keyed shaft 26 is fixed. Cylindrical support 28, having keyway 30, is fitted on shaft 26 so that keyway 30 meshes with key 32 and holds cylindrical support 28 in fixed angular position with respect to shaft 26. Support shaft 34 is fixed to cylindrical support 28 and crystal 36. Frame 10 is completely enclosed underneath threaded shaft 20 and has opaque case 38 fastened by screw fasteners 40 to its upper portion so that the crystal and phototube assembly is completely shielded against light.

In the operation of a radiation detecting and measuring device according to this invention, a crystal 36 and phototube 17 are inserted in their described positions and tube 17 is conventionally connected through socket 15 to an external counting circuit, not shown. The element as shown is then placed in known radioactive fields and calibrated by turning knob 22 until the reading given by the external counting circuit coincides with the known field strength. Such calibration may be marked on frame 10 near knob 22 or may be tabulated separately. In calibrating and in using a device according to this invention, knob 22 is rotated clockwise or counter-clockwise which causes threaded shaft 20 to rotate similarly. The rotation of shaft 20 causes threaded block 16 to move longitudinally along shaft 20 because of the engagement of the enclosed shaft 20 with the threaded bore of block 16. The longitudinal movement of block 16 causes tube carriage 14 and phototube 17 to move in the same manner because of their fixed relation to the carriage. The longitudinal movement of tube 17 along the axis of shaft 20 causes the distance between tube 17 and crystal 36 to vary. This variation of distance between tube 17 and crystal 36 determines a factor describing the probability that a photon of light emitted by the crystal will hit the photo cathode of the phototube. Such probability is light emitted by the crystal will hit the photocathode subtends and remains constant for any one setting of distance between crystal and phototube. Once calibrated, the device according to this invention is capable of use for measuring unknown fields in the following manner.

First, the amount of energy contained by the maximum energy quanta of the unknown field is determined by one of the methods well known to those skilled in the art: knob 22 is then turned to the position, found by calibration against a known field, where every time one maximum energy quantum in the unknown field is absorbed by the crystal, the phototube causes the external counting circuit to register one count.

The counting circuit will then count each light flash due to a maximum energy quantum in the unknown field being absorbed and proportionally count light flashes due to lesser energy quanta being absorbed. Thus a count which directly reflects the amount of energy absorbed by the scintillating medium can be obtained. The device is then placed in the unknown field and the count registered by the counting circuit is multiplied by the energy contained in the predetermined maximum energy quanta of the unknown field. The resulting product is the amount of energy absorbed by the scintillating crystal.

It is obvious to those skilled in the art that a determination of the amount of energy absorbed by a given object, such as the scintillating crystal described herein, is readily converted to indicate the amount of energy a living object would absorb when placed in the same field by merely comparing the absorption characteristics of the two objects.

Other embodiments of this invention, not materially differing from the described device will suggest themselves. A few, but not all of which are, a lens or shutter system employed to obtain the necessary geometrical control; liquid scintillating media in place of the crystal described, or any combination of these variations and the device described.

As many apparently widely different embodiments of this invention may be made without departing from the spirit and scope hereof, it is to be understood that the invention is not limited to its specific embodiments except as defined in the appended claims.

What is claimed is:

1. The method of obtaining a measure of the amount of energy an object placed in a radioactive field will absorb which comprises placing a medium which will scintillate when subjected to radioactive bombardment in a radioactive field, counting each flash of said scintillating medium which is a result of that medium wholly absorbing one quantum which has the highest quantum energy of any quantum in said radioactive field, proportionally counting all other flashes due to energy absorbed by said medium and multiplying the total count so obtained by the amount of energy contained by the quantum having the highest quantum energy of any quantum in the field to obtain a measure of the amount of energy absorbed by said medium.

2. A device for measuring energy absorbed from a radiation field comprising, scintillating means sensitive to radiation, counting means for counting light flashes emitted by said scintillating means, and means for varying for the amount of interaction of said scintillating means and said counting means until, at most, one count is registered each time a quantum of energy which has the maximum energy of the quanta in said radiation field excites said scintillating means and lesser quanta of energy have a proportionally smaller probability of causing said counting means to similarly register when said lesser quanta excite said scintillating means.

3. A device as claimed in claim 2, wherein said means for varying said amount of interaction of said scintillating means and said counting means comprises means for adjusting the distance between the scintillating means and the counting means.

4. A device for measuring energy absorbed from a radiation field comprising, a scintillating crystal, a phototube responsive to scintillations emitted from said crystal, a counter circuit coupled to said phototube for counting the responses of said phototube of said scintillations, means for adjusting the distance between said crystal and said phototube so that one count is registered each time a quantum of energy having the maximum energy of the quanta in said radiation field excites said scintillating crystal and lesser quanta of energy have a proportionally smaller probability of causing said counting means to similarly register when said lesser quanta excite said scintillating means, and a covering, opaque to light, for inclosing as a unit said phototube and crystal.

5. In the method of obtaining a measure of the amount of energy an object in a radioactive field will absorb by means of a scintillating medium sensitive to radiation: the steps of counting each flash of said scintillating medium which is a result of that medium wholly absorbing one quantum which has the highest quantum energy of any quantum in said radioactive field, and proportionally counting all other flashes due to energy absorbed by said medium.

6. In the method of measuring energy absorbed from a radiation field by means of a scintillating means sensitive to radiation, and counting means for counting light flashes emitted by said scintillating means, the step of adjusting the distance between the counting means and the scintillating means until, at most, one count is registered each time a quantum of energy which has the maximum energy of the quanta in said radiation field excites said scintillating means and lesser quanta of energy have a proportionally smaller probability of causing said counting means similarly to register when said lesser quanta excite said scintillating means.

7. In the method of measuring energy absorbed from a radiation field by means of a scintillating means sensitive to radiation, a phototube responsive to scintillations emitted from said scintillating means, and a counter circuit coupled to said phototube for counting the responses of said phototube to said scintillations, the step of adjusting the geometric relationship between said phototube and said scintillating means to satisfy the equation $PGe/e_n=1$ when the scintillating means absorbs an amount of energy equivalent to the maximum energy of any quanta in said radiation field; where G is a geometric factor describing the probability that one photon of light emitted by the scintillating means will strike the photocathode of said phototube, P is a probability factor describing the probability that one light photon striking said photocathode of said phototube will release one electron from said cathode, e is the energy transferred to the scintillating means when said scintillating means absorbs an amount of energy equivalent to the maximum energy of any quanta in said radiation field, and $e/e_n$ describes the number of light photons produced in the scintillating means due to the absorption of an amount of energy equivalent to the maximum energy of any quanta in said radiation field.

HARTMUT KALLMANN.

References Cited in the file of this patent

UNITED STATES PATENTS

| Number | Name | Date |
|---|---|---|
| 878,456 | Darwin | Feb. 4, 1908 |
| 1,693,763 | Martin | Dec. 4, 1928 |
| 1,995,890 | Lord | Mar. 26, 1935 |
| 2,399,061 | Rosenblum | Apr. 23, 1946 |
| 2,550,106 | Coltman et al. | Apr. 24 1951 |
| 2,550,610 | Smith et al. | Apr. 24, 1951 |
| 2,566,868 | Allia | Sept. 4, 1951 |

OTHER REFERENCES

The Scintillation Counter, by J. W. Coltman, reprinted from the Proceedings of the I. R. E., vol. 37, No. 6, June 1949.